United States Patent [19]

Ozawa

[11] Patent Number: 4,511,804
[45] Date of Patent: Apr. 16, 1985

[54] NOISE REDUCTION APPARATUS FOR HYBRID IMAGE SENSOR

[75] Inventor: Takashi Ozawa, Kanagawa, Japan

[73] Assignee: Fuji Xerox Co., Ltd., Tokyo, Japan

[21] Appl. No.: 382,838

[22] Filed: May 27, 1982

[30] Foreign Application Priority Data

Nov. 13, 1981 [JP] Japan .............................. 56-182091

[51] Int. Cl.³ .............................................. H04N 5/30
[52] U.S. Cl. ................................... 250/578; 358/167; 358/213
[58] Field of Search .................... 250/578, 209, 211 J; 358/212, 213, 167; 357/29, 30, 31, 32

[56] References Cited

U.S. PATENT DOCUMENTS

| | | | |
|---|---|---|---|
| 4,045,817 | 8/1977 | Nakatani et al. | 250/578 X |
| 4,067,046 | 1/1978 | Nakatani et al. | 358/213 |
| 4,145,721 | 3/1979 | Beaudouin et al. | 250/578 X |
| 4,283,742 | 8/1981 | Izumita et al. | 358/213 |

Primary Examiner—Edward P. Westin
Attorney, Agent, or Firm—Sughrue, Mion, Zinn, Macpeak, and Seas

[57] ABSTRACT

A document sensing device is herein disclosed whereby the signal-to-noise ratio inherent in a large-size image sensor is enhanced by a reduction in system noise. A plurality of photodetectors are connected to a plurality of storage MOSFETs. Two signal wires are connected to alternating groups of the MOSFETs. A shift register is provided which sequentially turns on the MOSFETs. The connections of the groups of MOSFETs and the sequential turn-on sequence are both preselected such that at the same time one group of MOSFETs is outputting a composite signal (information plus noise) on one signal wire, the immediately preceding group of MOSFETs is outputting a signal (noise only) on the other signal wire. Upon the combination of the signals in a differential amplifier, the noise signal is thus eliminated from the composite signal.

10 Claims, 6 Drawing Figures

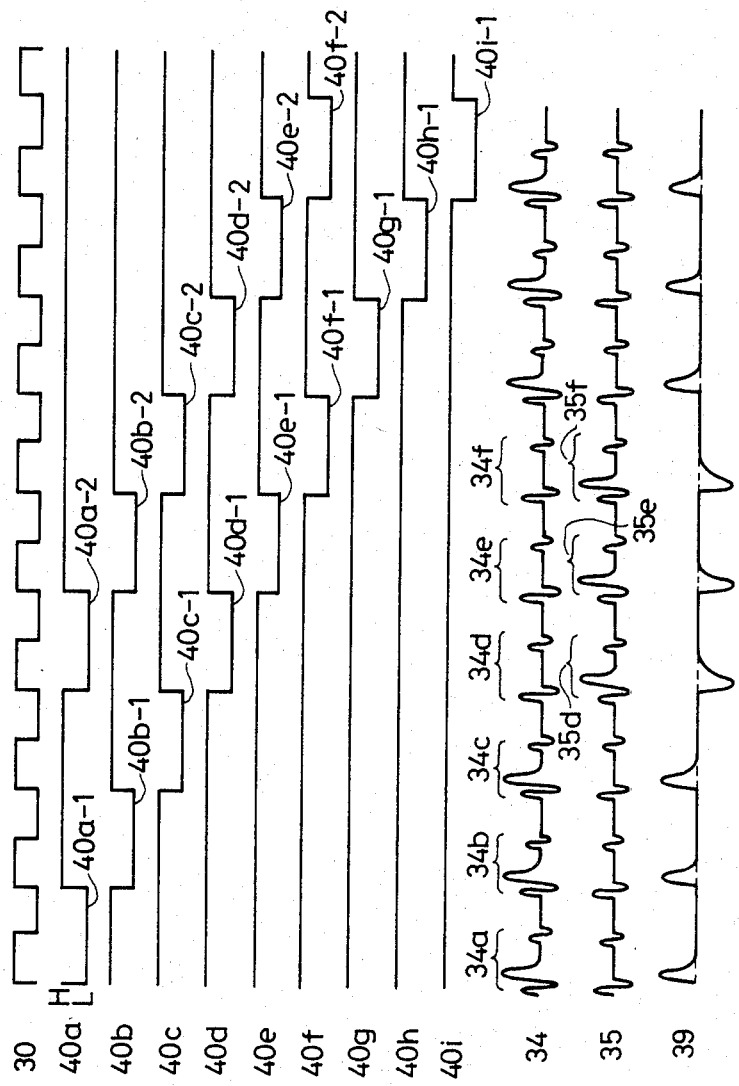

NOISE REDUCTION APPARATUS FOR HYBRID IMAGE SENSOR

BACKGROUND OF THE INVENTION

This invention relates generally to a document reader device for use in facsimile data transmission or the like. In particular, it relates to a system for reducing noise in a large-size document reader device which has been recently developed as a counterpart to an array of MOS photodiodes or a CCD image sensor.

Large-size document reader devices (hereinafter referred to as a "large-size image sensors") are defined as document readers which are physically as large as the document or script to be read. Large-size image sensors "read" (or sense) a document image by employing an optical system, such as an array of either optical fibers or lenses, to focus the document image. This system is advantageous in that since it does not utilize a magnified image of the document, it has a reduced optical path for image focusing, thus making the system in general smaller in size than those systems in the prior art utilizing magnified images.

FIG. 1(a) shows an equivalent circuit of a conventional large-size image sensor, and FIG. 1(b) shows the structure of a photosensitive element 1. As shown in FIG. 1(b), the photosensitive element 1 comprises a photoconductor thin film 21 composed of an amorphous material such as Se-As-Te, a -Si, or a polycrystal material such as CdS or CdSe. Thin film 21 is "sandwiched" between a thin film electrode 22 consisting of Al, Cr or Au, and a continuous transparent thin film electrode 23 consisting of either $SnO_2$ or ITO. Referring to FIG. 1(a), the photosensitive element 1 is schematically represented as a photodiode 1a and a capacitor 1b, the capacitor 1b representing the inherent capacitance of the photosensitive element 1. A plurality of such photosensitive elements are arranged in an array of a density required to resolve a document or script, such as 8 elements/mm.

A charge stored in the capacitor 1b is discharged by the photodiodes 1a as a function of the amount of light which has condensed upon the photosensitive element 1. MOSFETs 2 are successively turned on at certain intervals by a shift register 3, to recharge the capacitors 1b. A current generated uon such recharging is detected by an output terminal 6 to read optical information.

With the large-size image sensor of the above construction, the photosensitive element 1 can be fabricated by forming the conductive thin film 22, the photoconductive thin film 21 and the transparent conductive film 23 on one substrate 24 composed of such materials as glass or ceramics, through typical processes such as evaporation, sputtering, or CVD. Since the MOSFETs 2 and the shift register 3 are independent devices, they cannot be fabricated integral to the photosensitive element 1. It is therefore necessary to mount the MOSFETs 2 and the shift register 3 on the substrate 24 or another substrate, and to connect them to the photosensitive element 1 by way of such methods as wire bonding. To effect such a connection, a wire 7 extends from the photosensitive element 1 to the corresponding MOSFET 2. The length of the wire 7 is in reality larger in proportion to the circuit elements than it appears to be in the equivalent circuit. In addition, signal line 8 has a length of several tens of centimeters in the large-size image sensor. Thus, capacitances between the wires or signal lines are quite large, and cause an amount of non-negligible noise to be introduced into the signal line 8, resulting in a lowered signal-to-noise ratio.

In an attempt to eliminate the foregoing difficulty, the present application has proposed a system which utilizes dummy MOSFETs to effect differential amplification, as described in an application entitled "Document Reader Device" filed on Nov. 10, 1981, in Japan and laid open on May 16, 1983 as No. 80865/83. That Japanese application is commonly assigned. As shown in FIG. 2 herein, the system comprises switching MOSFETs 2, dummy MOSFETs 10, and photosensitive elements 1. The MOSFETs 2 and 10 produce outputs which are differentially amplified such that the composite signal has a good signal-to-noise ratio. However, with two independent MOSFETs connected for each photosensitive element, the area needed to package all of the MOSFETs is twice as large as that required by the typical image sensor circuitry shown in FIG. 1(a). When the MOSFETs of the proposed system are fabricated on an IC chip, such an IC chip will therefore have a large packaging area. The increased packaging area presents an obstacle to the reduction in size of large-size document reader devices.

It is thus an object of the present invention to eliminate the decreased signal-to-noise ratios of large-size image sensors without appreciably increasing the size of the photodetector IC package.

SUMMARY OF THE INVENTION

According to the present invention, noise reduction is achieved, and hence signal-to-noise ratio is improved, without increasing the number of MOSFETs used. More specifically, two signal lines are connected to the MOSFETs, and adjacent MOSFETs are grouped together and are coupled alternately to the signal lines, such that suitable switching of the MOSFETs for differentially amplifying the signals delivered over the signal lines is achieved. The improved differential amplification results in a reduction in the noise of the composite image signal, which enhances the signal-to-noise ratio of the system.

BRIEF DESCRIPTION OF THE DRAWINGS

FIG. 4 is a timing chart, along with a diagram showing the waveforms of the corresponding output signals, for the operations of the elements of the large-size image sensor of the present invention.

DESCRIPTION OF THE PREFERRED EMBODIMENTS

Figure 1A:
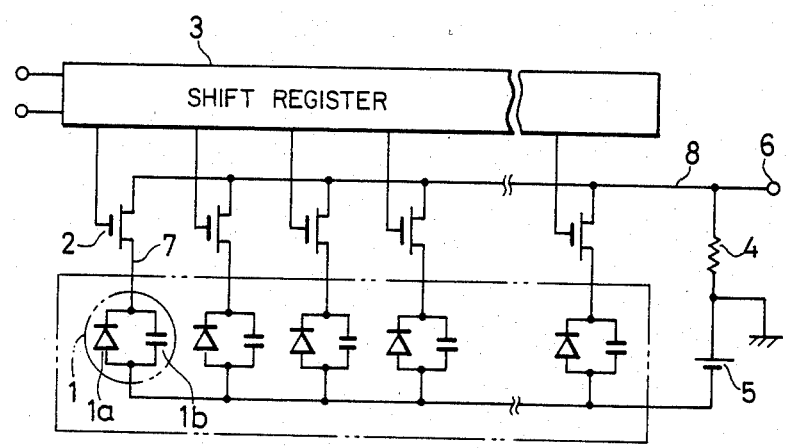
FIG. 1(a) is an equivalent circuit diagram of a conventional large-size image sensor.
Figure 1B:
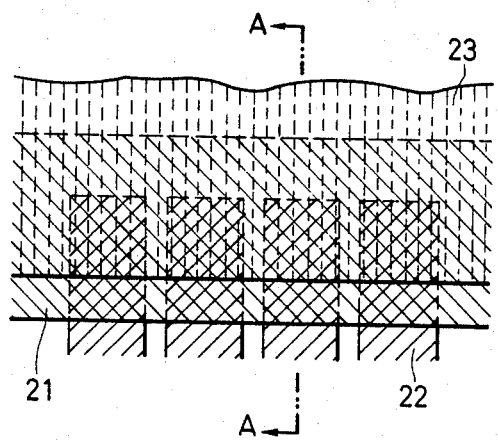
FIGS. 1(b) and 1(c) are plan and side views of a photosensitive element of a conventional large-size image sensor.
Figure 1C:
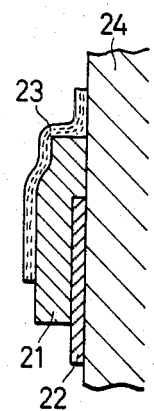
Figure 2:
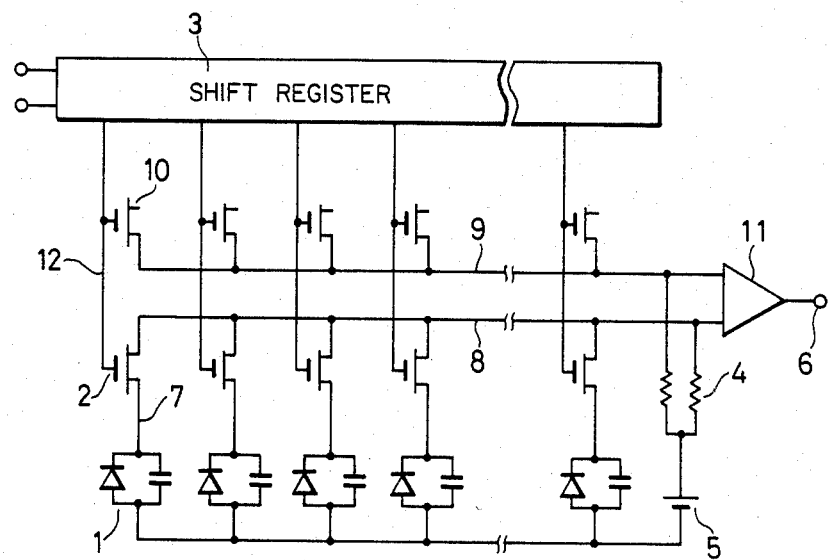
FIG. 2 is a circuit diagram of a prior art circuit for reducing noise in a conventional large-size image sensor.
Figure 3:
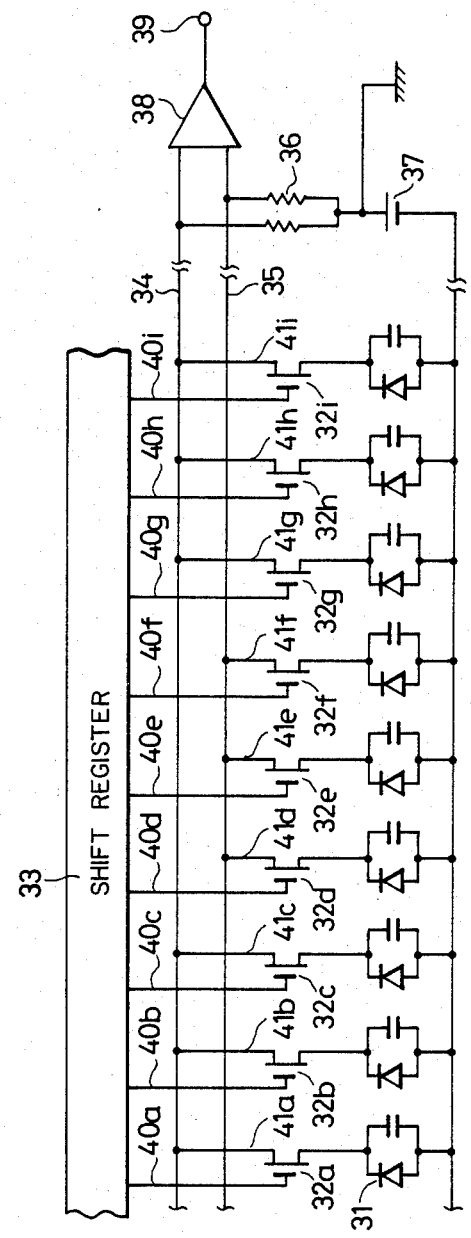
FIG. 3 is an equivalent circuit diagram of a large-size image sensor according to the present invention.

The present invention will now be described with reference to FIG. 3. In FIG. 3, two signal lines 34, 35 are connected alternately to the sources 41a, 41b ... 41i of MOSFETs 32a, 32b ... 32i. Although in the illustrated embodiment the MOSFETs are separated and grouped such that three adjacent MOSFETs are connected to the same signal line, it is to be understood that they may be divided into groups ranging from one to several tens of adjacent MOSFETs.

The operation of the document reader device as shown in FIG. 3 will be described with reference to the timing chart of FIG. 4.

The shift register 33 in FIG. 3 is driven by a clock signal 30. Signals 40a–40i are supplied to the gates of the MOSFETs 32a–32i by the shift register. Each of the signals turns on the corresponding MOSFET when the signal is at the low logic level, and turns off the MOSFET when it goes high. First, the signals 40a, 40b, 40c successively go low to turn on MOSFETs 32a, 32b, 32c by successively introducing the pulses 40a—1, 40b—1, 40c—1, respectively, to the gates of the MOSFETs. Signals 34a, 34b, 34c, which contain both optical signals and noise, are now delivered over signal line 34. Then, the signals 40d, 40e, 40f successively go low to produce pulses 40d—1, 40e—1, 40f—1 which turn on the MOSFETs 32d, 32e, 32f, respectively, in succession. Thus, signals 35d, 35e, 35f, which are a mixture of optical signals and noise, are delivered over the signal line 35. Simultaneously with the above operation, the signals 40a, 40b, 40c are rendered low successively to produce pulses 40a—2, 40b—2 and 40c—2, which cause MOSFETs 32a, 32b, and 32c to deliver signals 34d, 34e, 34f (containing noise only) to the signal line 34. Thus, one set of signals, comprising optical signals and noise, and another set of signals, which comprises of noise only, are simultaneously transmitted over the signal lines 34 and 35. The signals supplied through the signal lines 34 and 35 are differentially amplified by a differential amplifier 38 such that the signal appearing at its output terminal 39 comprises of optical signal 39 only. In FIG. 4, the solid line portions of optical signal 39 are generated when light falls upon photosensitive elements 31, and the dotted line portions are generated when no light falls upon the photosensitive elements 31.

In summary, the document reader device of the present invention is capable of producing an accurate output signal with an enhanced signal-to-noise ratio. As a result of this improved signal-to-noise ratio, a source of light for illuminating a document or script may be reduced in intensity, and the speed at which the document is read can be increased. Further, the advantages of the document reader device of the prsent invention hold true regardless of the length of the signal lines 34, 35. Thus, the present invention is highly advantageous when applied to large-size image sensors in which the signal lines 34, 35 are more than 20 centimeters long, in that it eliminates the capacitive noise produced by such long couplings. The number of MOSFETs used to equal to the number of photosensitive elements, such that the packaging area in which the MOSFETs are disposed may be reduced.

It is apparent that modifications of this invention may be practiced without departing from the essential novelty thereof.

What is claimed is:

1. A document sensing device comprising: means for sensing light reflected by a document and generating an output signal and comprising a plurality of photodetectors, means for storing said output signals received from said means for sensing light and comprising a plurality of MOSFET devices fabricated at a device location separately from said photodetectors, shift register means for selectively outputting the content of said means for storing signals by sequentially initiating the outputs of said means for storing said output signals, and output means whereby noise signals inherent in said stored signals are eliminated.

2. The document sensing device of claim 1, wherein one of each of said plurality of photodetectors is connected to one of each of said plurality of MOSFET devices.

3. The document sensing device of claim 1, wherein said output means comprises a plurality of signal transmitting means and a differential amplifier.

4. The document sensing device of claim 3, wherein said means for storing signals are selectively connected to said plurality of signal transmitting means in a plurality of groups.

5. The document sensing device of claim 4, wherein signals outputted by said sequential initiation of said outputs of said means for storing signals comprise signals corresponding to both light sensed by said means for sensing light and system noise.

6. The document sensing device of claim 5, wherein said shift register sequentially reinitiates the outputs of said means for storing signals only when an immediately subsequent group of said plurality of groups of said means for storing signals has been initiated.

7. The document sensing device of claim 6, wherein signals outputted by said sequential reinitiation of said outputs of said means for storing signals comprise signals corresponding to system noise.

8. The document sensing device of claim 7, whereby said signals corresponding to system noise and said signals corresponding to both light sensed by said means for sensing light and system noise are simultaneously transmitted over said plurality or signal transmitting means.

9. The document sensing device of claim 8, wherein said output means selectively amplifies the signals outputted by said plurality of signal transmitting means, and whereby said signals corresponding to system noise are eliminated.

10. A document sensing device comprising: a plurality of photodetectors; a plurality of MOSFET devices fabricated at a device location separately from said photodetectors; a plurality of signal transmitting means, said MOSFET devices being selectively connected in alternating groups to said plurality of signal transmitting means; a shift register coupled to said MOSFETs for sequentially initiating said MOSFET to output signals on one of said signal transmitting means corresponding to both light sensed by said plurality of photodetectors and system noise, and said MOSFETS are subsequently sequentially reinitiated when a subsequent group of said MOSFETs are initiated, to output signals on the other of said signal transmitting means corresponding to said system noise; and an output detection means wherein signals outputted by said plurality of signal transmission means are combined, and said system noise is eliminated.

* * * * *